United States Patent [19]

Cateora et al.

[11] 4,014,166

[45] Mar. 29, 1977

[54] SATELLITE CONTROLLED DIGITAL CLOCK SYSTEM

[75] Inventors: Joseph V. Cateora; Dicky D. Davis; D. Wayne Hanson, all of Boulder, Colo.

[73] Assignee: The United States of America as represented by the Secretary of Commerce, Washington, D.C.

[22] Filed: Feb. 13, 1976

[21] Appl. No.: 657,918

[52] U.S. Cl. ................................ 58/26 R; 343/225

[51] Int. Cl.$^2$ ..................... G04C 13/08; H04B 7/00

[58] Field of Search ................................ 58/24–26; 340/147, 163; 343/225

[56] References Cited

UNITED STATES PATENTS

| | | | |
|---|---|---|---|
| 3,472,019 | 10/1969 | Webb | 58/24 R |
| 3,541,552 | 11/1970 | Carlson | 343/225 |
| 3,751,900 | 8/1973 | Phillips et al. | 58/24 R |

*Primary Examiner*—E. S. Jackmon
*Attorney, Agent, or Firm*—Eugene J. Pawlikowski; Alvin J. Englert

[57] ABSTRACT

A method and apparatus are provided for maintaining and correcting a time reference in a satellite controlled digital clock system. A time code message including time-of-year information and satellite position information is transmitted in a data stream from a transmitter on earth to a satellite orbiting the earth to be relayed back to receivers located around the world. The data is transmitted at a precise data rate. According to the invention, a local clock oscillator is phase locked with the precise data rate, thereby providing the clock system with time-of-year information by counting the pulses produced by the local oscillator. At the same time, the digital clock system assembles the time code message from the received data stream and compares the message with the time accumulated by counting the pulses produced by the oscillator. After a predetermined number of errors are detected by such comparisons, the clock system resets itself to coincide with the received time code message. If transmission of the time code message is interrupted, the clock continues counting pulses produced by the local oscillator and thereby continues keeping time undisturbed. In a preferred embodiment, the digital clock system is implemented with a firmware programmed micro-computer and the time-of-year and satellite position information is displayed on light emitting diode digital displays.

10 Claims, 8 Drawing Figures

TO FIG. 3B

SATELLITE CONTROLLED DIGITAL CLOCK SYSTEM

FIELD OF THE INVENTION

This invention relates to a digital clock system, and, more particularly, to a digital clock system which is controlled by a time code transmitted by a satellite in orbit around the earth.

BACKGROUND OF THE INVENTION

There has long been a need for a system for distributing accurate time code information between a master clock and multiple remote clocks at various locations. For example, satellites are used today to gather data from remote observing points such as buoys, automatic weather stations, balloons, aircraft, and ships. Such remote stations require accurate time-of-year information to date, i.e., provide a time-of-year identification of the data as the data is collected and to properly interface their transmissions with the satellites. In addition, accurate time-of-year information is required for navagational purposes by ships and aircraft. There have been numerous prior attempts at synchronizing a remote clock with a master clock. For example, prior art systems of this type are disclosed in U.S. Pat. Nos. 3,728,485, 3,648,173, and 3,751,900, although this listing obviously is not, nor is it intended to be, exhaustive. In each of these systems, a signal is transmitted from an orbiting satellite containing a precise time "beep." The time "beep" is transmitted at regular intervals and is used by the remote location to adjust its time clock accordingly. A commom problem with systems of this type is to initially put the local clock in time synchronization with the master clock. Further, any interruptions in reception by a local clock can result in the loss of time synchronization.

SUMMARY OF THE INVENTION

A series of synchronous meteorological satellites (SMS), under the direction of the National Aeronautics and Space Administration and Geostationary Operational Environmental Satellites (GOES) under the direction of the National Oceanic and Atmospheric Administration, transmit time-of-year information, time multiplexed with other data not discussed herein. The time information transmitted by these satellites is transmitted at a highly precise data rate.

More specifically, a time-of-year time code message is transmitted by the satellites every thirty seconds, commencing on the minute and on the half minute. Data transmitted for each thirty second period is hereinafter referred to as a data record. The complete time code message is disassembled at the transmitter into four bit segments which are multiplexed in the data stream with a fixed bit pattern synchronization sequence and additional data not used by the present invention. Each section of the transmitted data stream, containing one 4-bit time code segment, is hereinafter referred to as a data block. Thus, the complete time code message can be assembled by locating the time code segments within the data stream, determining the beginning of the time code message and storing successive segments until the entire message is assembled. The data stream is transmitted at a precise data rate and is of itself an accurate time base record.

According to the present invention, a digital clock system is provided which receives the aforementioned time information signal and decodes and displays the time-of-year information for further use. In addition to time-of-year information, satellites transmit information as to their own navigational position so that the digital clock system can display that position for the purpose of calculating time delays between transmission and reception. The present invention further provides an inexpensive source of highly accurate time-of-year information which is self-synchronizing and not subject to the synchronizing problems of the prior art discussed above.

In accordance with a preferred embodiment, the present invention is implemented by means of a firmware programmed microcomputer. The system scans the data stream for the fixed bit synchronization pattern in order to locate the time code segments within the data stream. The time code segments that begin the time code message contain a further synchronization bit pattern, enabling the system to properly recognize the beginning of a time code message. The digital clock assembles the individual time code segments into a complete time code message and displays the message on a digitial display.

A local oscillator which is part of the digital clock system is phase-locked to the precise data rate of the received data stream. After receipt, assembly and display of the first time code message located in the data stream by the system, the digital clock system continues to keep time by counting the precise pulses produced by the phase-locked local oscillator. The clock system receives further time code messages and compares them to the time kept by the clock by counting pulses. If the comparison is successful, i.e., time coincidence is noted, nothing is done. If an error is found in the comparison, the system makes note of the fact but continues undisturbed. After a predetermined number of errors are detected, the system will resynchronize itself with the data stream and reset its time counter to coincide with the received time code message. If an interruption occurs in receipt of the data stream, the digital clock system will continue to count pulses undisturbed.

Other features and advantages of the invention will be set forth in, or apparent from, the detailed description of a preferred embodiment found hereinbelow.

Figure 5:
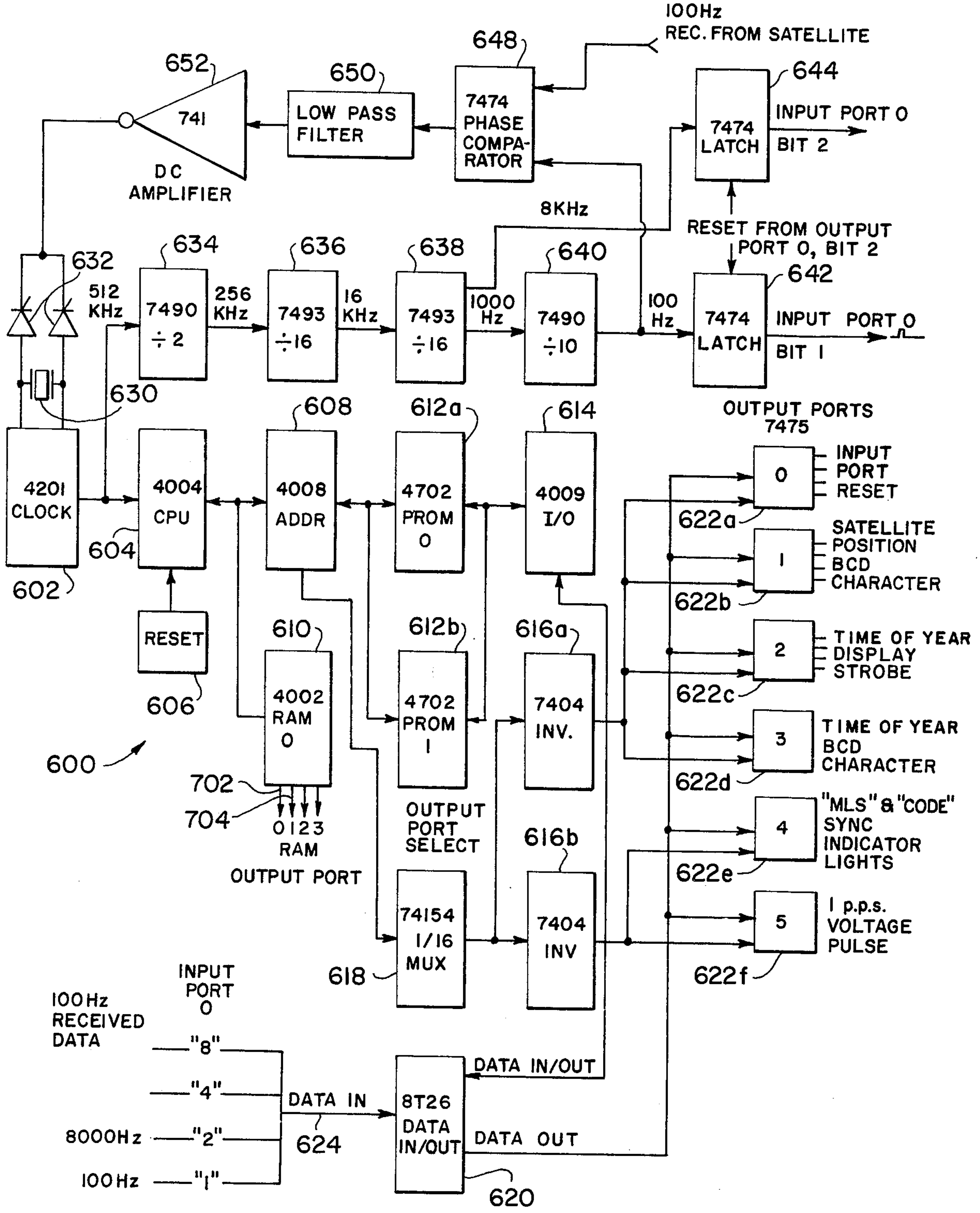
Figure 6:
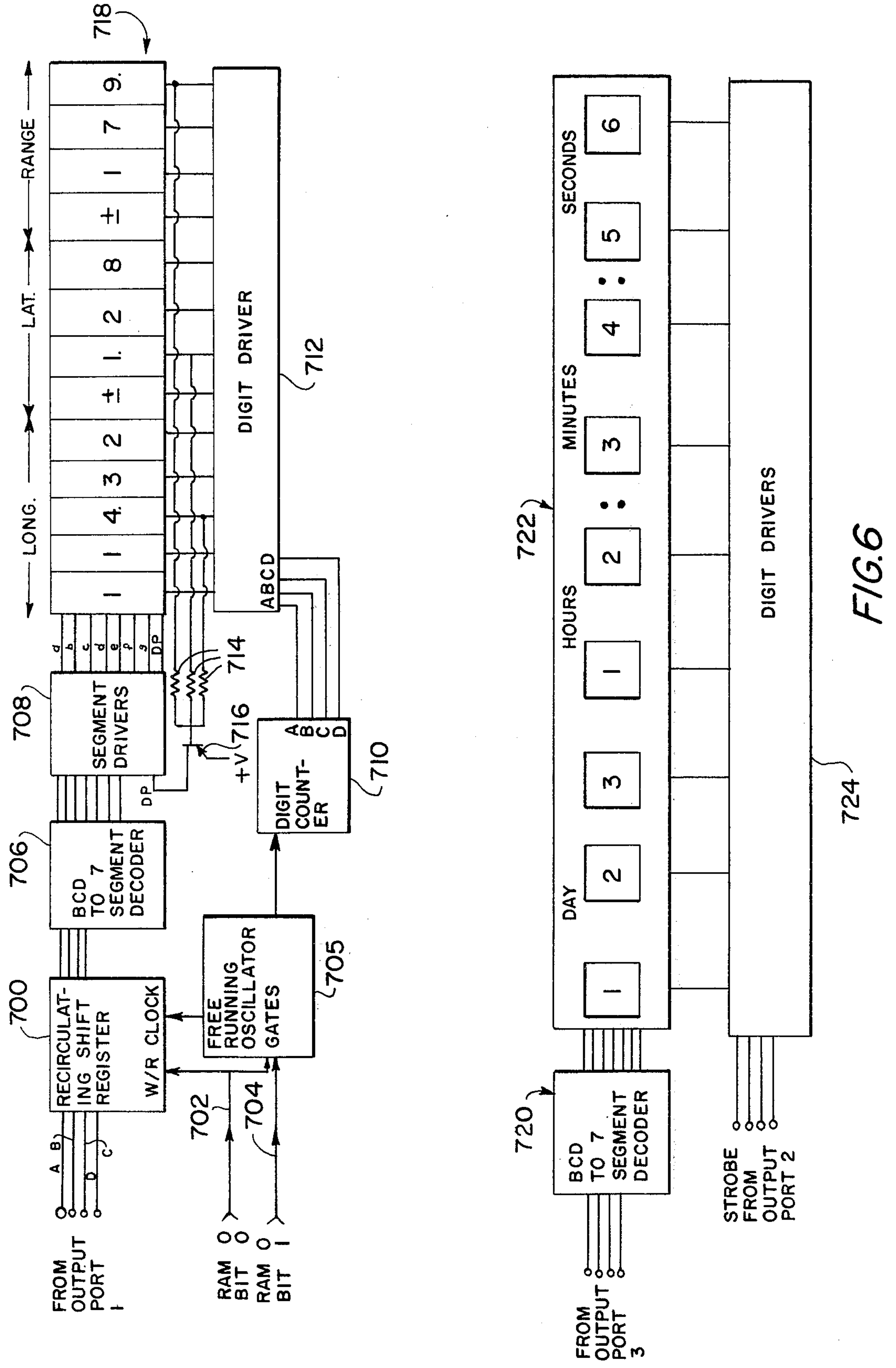

FIGS. *3a*, *3b* and 4 are flow charts representing the logical decisions made by the digital clock system according to the invention;

FIG. 5 is a schematic diagram in block form of the digital clock system according to the invention; and FIG. 6 is a schematic diagram in block form showing the display outputs for the clock shown in FIG. 5.

DESCRIPTION OF THE PREFERRED EMBODIMENTS

Figure 1:
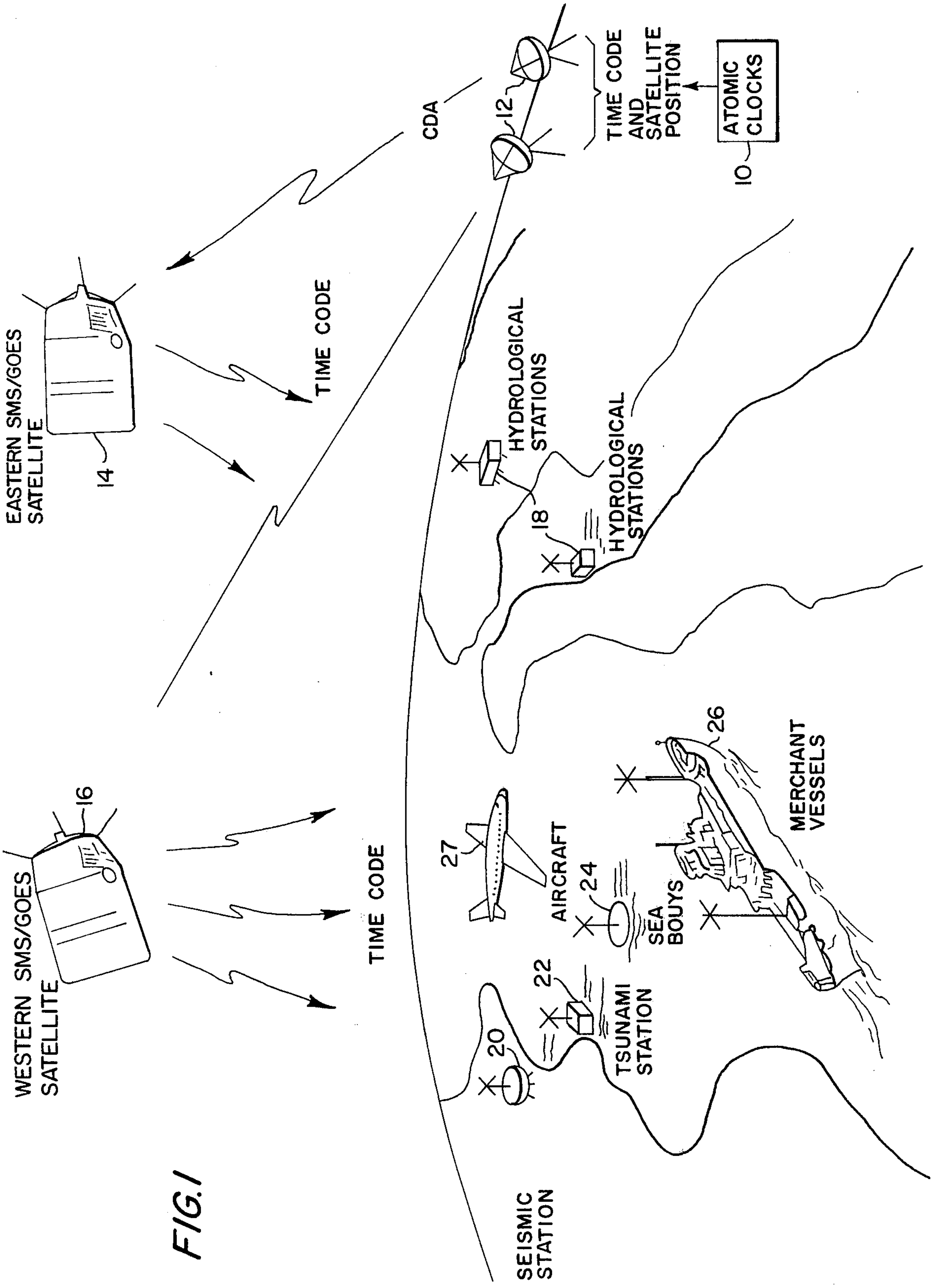
FIG. 1 is a schematic representation of the relationship between the master clock and the remote digital clocks according to the invention.

Referring to FIG. 1, there is shown, in a highly diagrammatic form, an exemplary configuration of a digital clock system according to the invention. A precise time source, atomic clock 10, provides transmitters 12 with time-of-year information. Transmitters 12 combine the time code information with current satellite position information and the address of the data collection point to be interrogated. This signal is transmitted to satellites 14 and 16 on the S-band to be relayed to data collection points located on the earth. Examples of such data collection points are hydrological stations 18, a seismic station 20, a Tsunami station 22, sea buoys indicated at 24, ocean vessels indicated at 26, and aircraft indicated at 27.

The receivers located at the data collection points are of conventional design and characteristically include a demodulator with a phase lock loop having a 20 Hz. tracking bandwidth and a timing recovery loop to derive the data clock for symbol sampling synchronization. The outputs of the receiver include both a data output and a data clock output which are used by the digital clock system of the invention as described hereinbelow. The time delay of a signal transmitted from transmitters 12 and transponded by satellites 14 and 16 back to the earth is on the order of 260,000 microseconds. Precise delay times can be calculated with the knowledge of the satellite position and, although not a part of the presently preferred embodiment of the invention, these delays could be calculated by the digital clock of the invention and included as an automatic correction to the time thereof.

Figures 2, 2A:
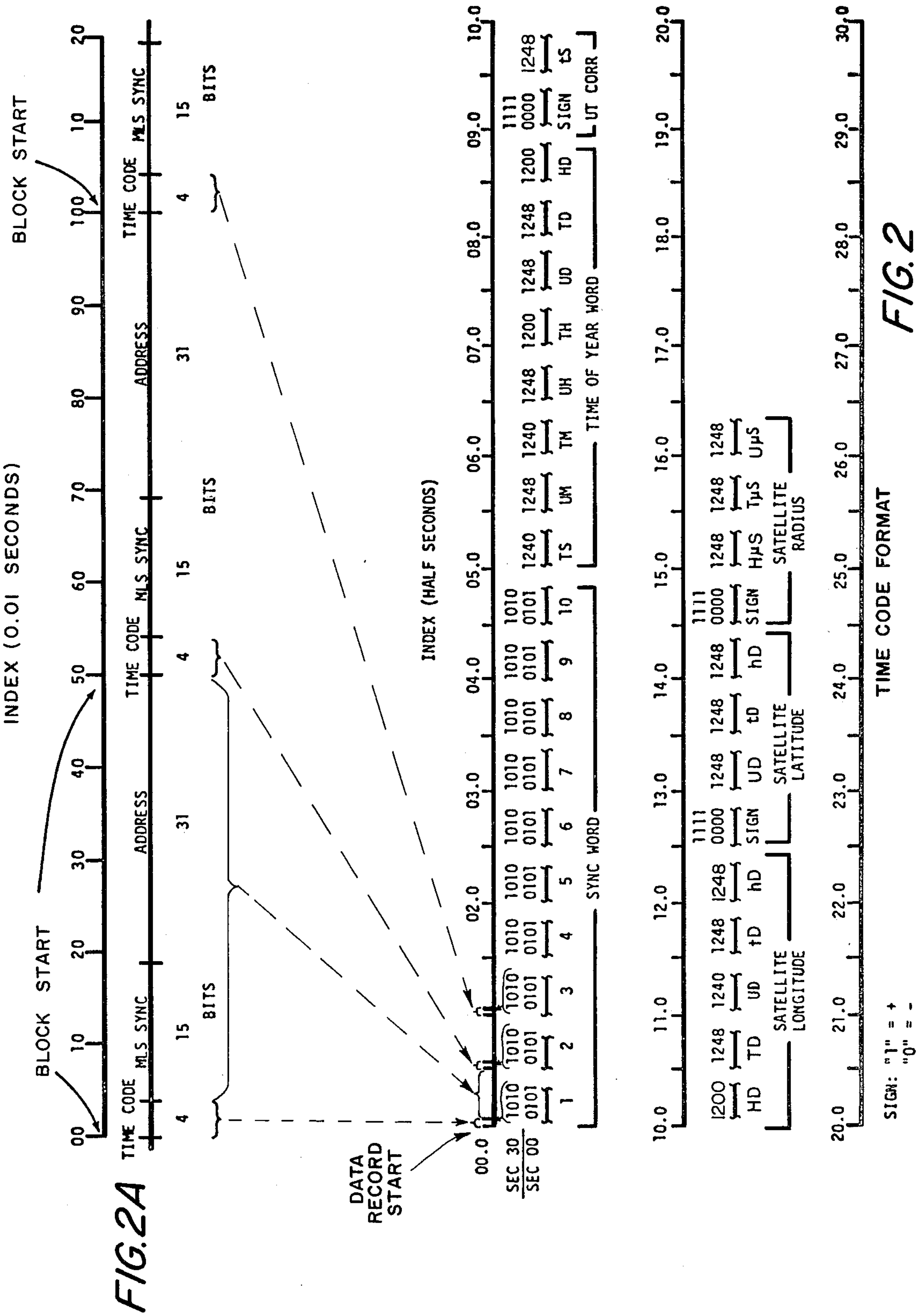
FIGS. 2 and *2a* are diagrams, in schematic form, showing the format of the data transmitted by the satellites.

Referring to FIGS. 2 and 2*a*, the format of the transmitted data is shown. Data is transmitted serially at 100 bits per second, each group of 50 bits being referred to as a block. Thus, each block of 50 bits, takes 500 mlliseconds to be transmitted. Each block is comprised of a four-bit time code segment, a maximum length sequence (MLS) synchronization code of 15 bits, and an interrogation address of 31 bits. This format is shown in FIG. 2*a* which is an expanded scale insert of the time code format shown in FIG. 2. Each time code segment is a portion of the entire time code message that is compiled by the digital clock over a 30 second period. The MLS SYNC code is a predetermined fixed bit sequence that is repeated in every block, and permits a receiver to determine the locations of the time code segments and interrogation address segments within the data stream. Therefore, once the digital clock has recognized the MLS code, the time code segment of each block can be located by skipping 31 bits, and then extracted and reconstructed into an entire time code message. The time code message is comprised of ten time code synchronization word segments, which are followed by eight time-of-year segments, two correction segments and thirteen satellite position segments. As is shown in FIG. 2, the entire time code message only requires sixteen and one-half seconds to transmit. The remaining thirteen and one-half seconds of the thirty second record period are not utilized in the present invention.

Synchronization between the transmitted data stream and the digital clock receiver is provided on two levels. On the first level, the receiver must determine where the four-bit time code segments are located within the data stream. This is determined by reference to the MLS SYNC code. Once the 4-bit time code segments are located, the receiver must determine where a particular segment belongs within the 30 second record. This is determined by means of ten SYNC words which are located at the beginning of each 30 second record. The SYNC words are 10 hexadecimal A's for time codes transmitted on the half minute. Thus, the digital clock locates the time code segments within the data stream and scans those time code segments until 10 consecutive SYNC words are found. At that point, the digital clock begins to assemble the entire time code message. It should be noted that while the time code message is sufficient to determine the time-of-year, the data being transmitted is so transmitted at a precise 100 bits per second rate. The precision of this data rate provides an additional accurate time reference.

The digital clock system of the invention takes advantage of the redundancy of information provided, i.e., takes advantage of the fact that an accurate time-of-year display can be maintained by either displaying directly the time code message received, or by counting the 100 bit per second clock from an initial time position. Thus, in operation, the digital clock scans the input data stream for the MLS SYNC code. Upon achieving MLS SYNC, i.e., locating this code, the clock begins to extract four bit time code segments, searching through them for ten consecutive SYNC word segments. At that point, the remaining time code segments are assembled by the digital clock into a complete time code message which is stored by the clock in a memory and is further displayed on a digital display. After being initialized by the reception of a first time code message, the clock further keeps time by counting the 100 bit per second data clock, updating its memory accordingly, and displaying the present time as represented by the counted clock pulses on its digital displays. At the same time, the clock continues to receive further time code messages, each 30 seconds, and compares the received time code message with the time stored in the memory of the digital clock. If the received time code message coincides with the stored time-of-year, then the clock continues counting clock pulses undisturbed. If the time received time code message is different from the stored time-of-year, the clock makes note of the error but does not change its stored time. Only after a predetermined number of such "frame" errors will the clock correct itself to receive time code message. However, it should be emphasized that before this correction process takes place, the clock will once again scan the data input stream for the MLS SYNC code, in order to insure that the received time code message which produced the frame error was, in fact, properly received. In this way the digital clock is prevented from being reset when no satellite signal is present.

In a preferred embodiment of the invention discussed hereinbelow, the digital clock system is implemented using a micro-computer. The micro-computer system, described in detail hereinafter, is of conventional design and is programmed by firmware that is contained in a read-only memory. It should be noted that the use of a programmed micro-computer in order to implement the present invention is a design choice and as will become more apparent from the discussions below, the invention could just as readily be implemented by one skilled in the art by using random digital logic design. To further enchance the accuracy of the clock system, the clock generator of the micro-computer is phase-locked with the 100 bit per second data clock. Thus, if for any reason the digital clock system fails to receive the 100 bit per second data clock, the digital clock system can count "its own clock" until resynchronization with the transmitted signal is achieved.

Figure 3A:
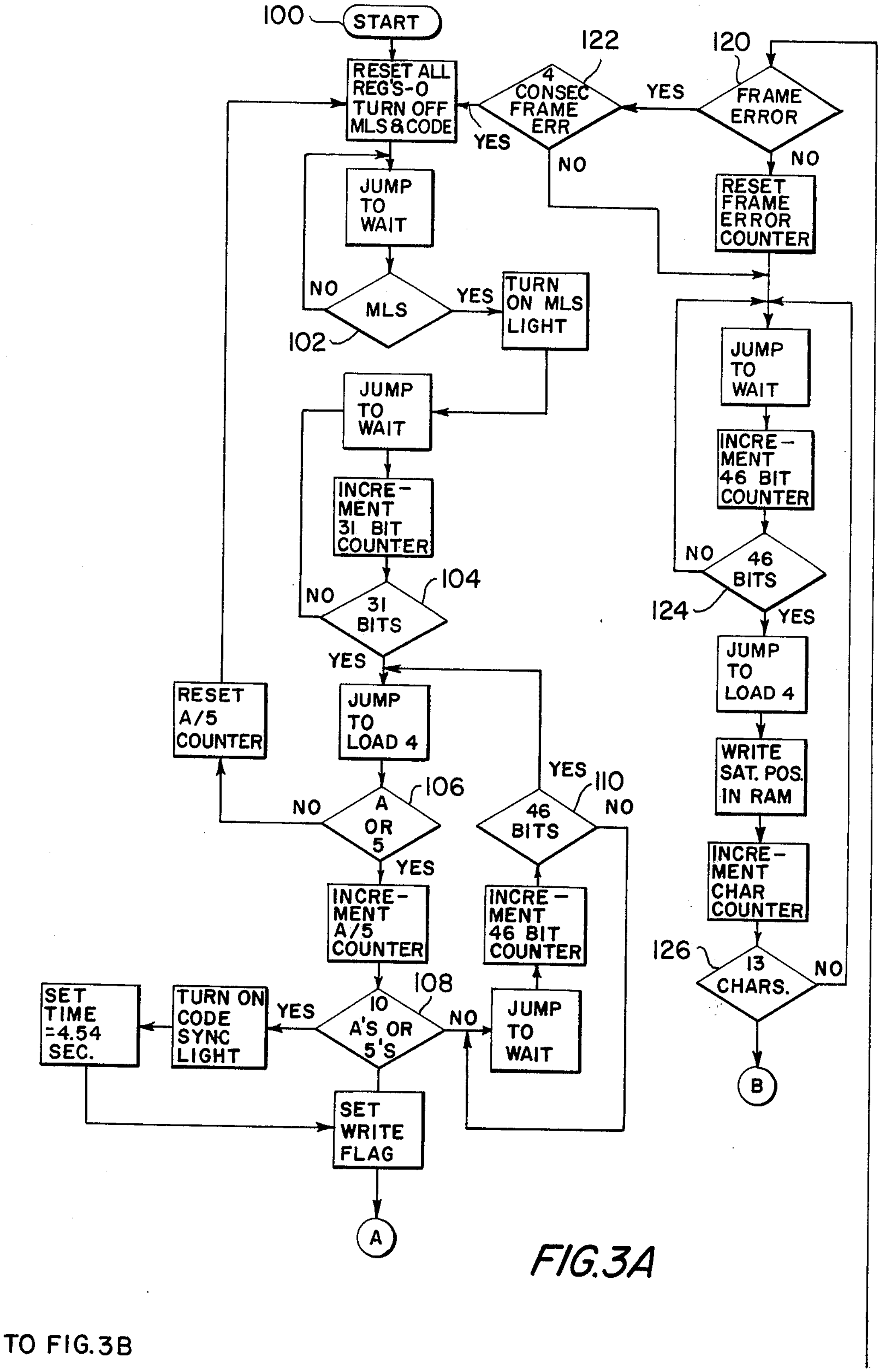
Figure 3B:
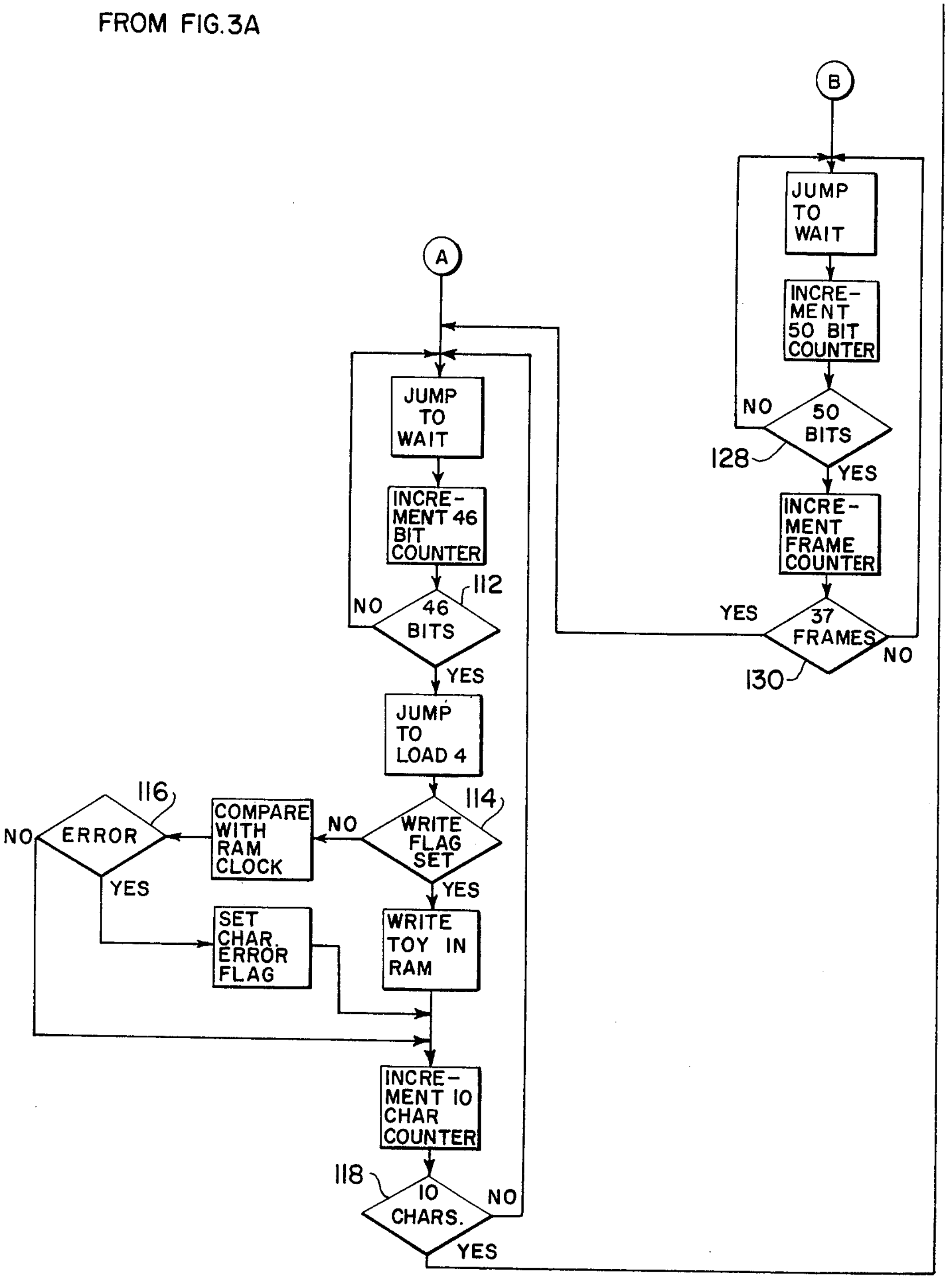
Figure 4:
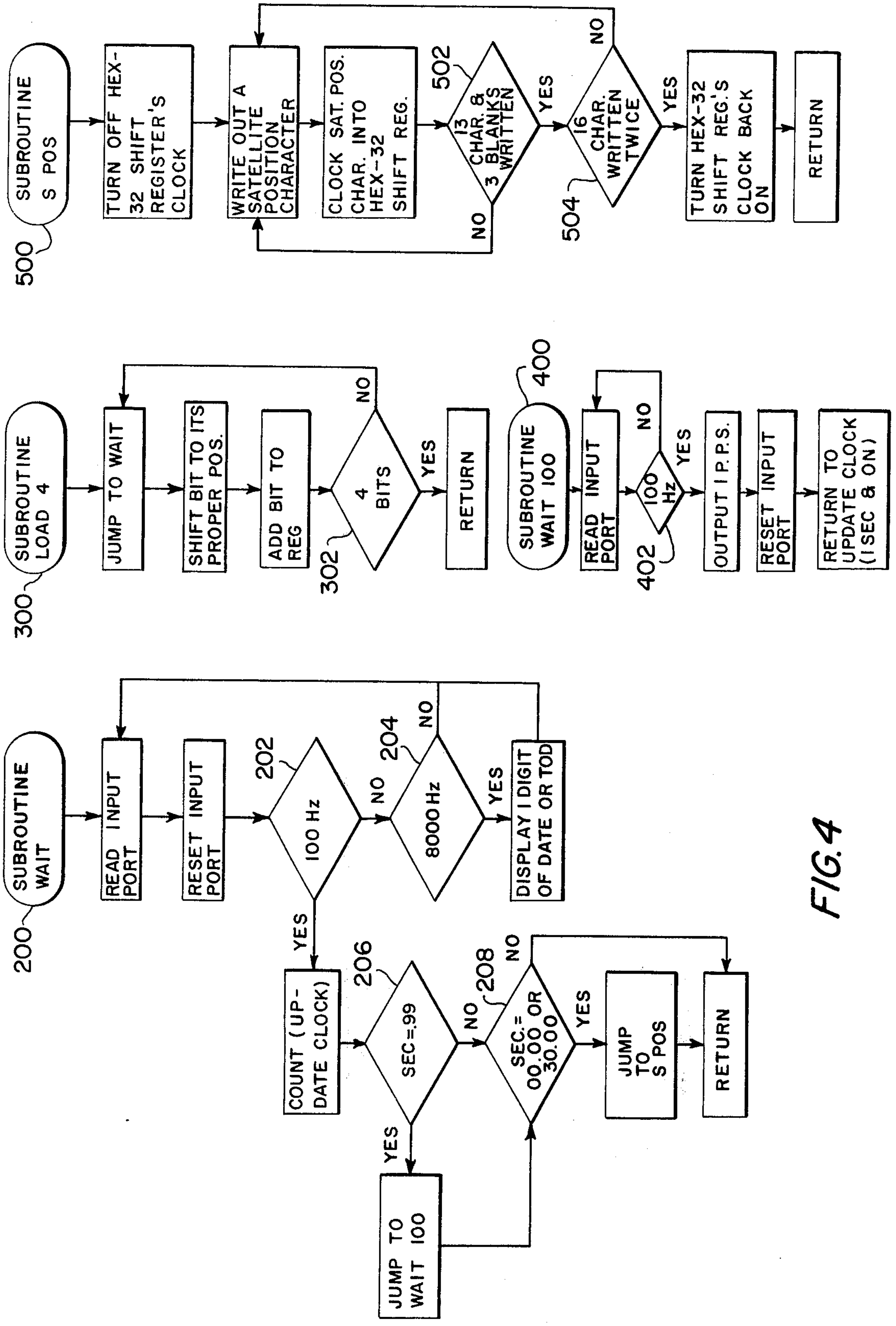

Referring now to FIGS. 3*a*, 3*b* and 4, a flow chart of the logical operations performed by the digital clock is shown. It is noted that a flow chart, by its very nature, is largely self-explanatory and provides an indication of the operations contemplated. Thus, to avoid burdening the discussion of FIGS. 3*a*, 3*b* and 4 with unnecessary description only the basic operations have been given reference numerals and are described in detail.

The logical flow begins at a start box indicated by the numeral 100. The computer initializes all registers to zero, and turns off all indicator lights. The computer then jumps to a subroutine WAIT, indicated in FIG. 4 by block 200. The subroutine WAIT performs the function of reading an input line of the computer and determining whether a 100 bit per second pulse is present. This decision is made at decision box 202. Before proceeding, it should be noted that the display of the digital clock is comprised of multiplexed light emitting diode digits of conventional design, this display being described in more detail hereinbelow. The subroutine WAIT further performs the function of displaying the multiplexed digits one at a time whenever a pulse from a separate 8,000 bit per second clock is present. This decision is performed by decision box 204. Therefore, if neither a 100 bit per second or an 8,000 bit per second pulse is present, the subroutine WAIT will loop back to the beginning thereof until one or the other of the two pulses is detected. Upon the detection of an 8,000 bit per second pulse, decision box 204 will display one digit of the stored time-of-year. Upon the detection of a 100 bit per second pulse, decision box 202 branches the program to a routine that will increment the internal memory of the digital clock by 0.01 of a second, and then make the further decision at decision box 206 as to whether or not the seconds count equals 0.99 seconds. If the answer is "yes", the computer jumps to a subroutine WAIT 100, indicated at 400.

Subroutine WAIT 100 further scans the input lines for a 100 bit per second pulse, and when such a pulse is found, a decision box 402 outputs a single pulse and returns to subroutine WAIT. The purpose of subroutine WAIT 100 is to insure that the clock system will recognize the next 100 bit per second pulse without possible distraction from the 8,000 Hz input, which is also scanned. Thus, in waiting for the pulse that changes the seconds counter from X.99 to X.00, the clock system only scans the 100 bit per second pulse input line.

After the operation is returned to subroutine WAIT, this subroutine determines whether or not the seconds count equals 00.00 or 30.00 in decision box 208. If the seconds count equals one of these 2 times, then subroutine WAIT will output, to the digital displays, the satellite position code that was last received by jumping to subroutine S POS. Subroutine WAIT thereafter returns to the main program.

At this time, decision box 102 of the main program determines whether or not the last 15 received data bits correspond to the predetermined MLS SYNC code. If not, the program loops to input additional data; if yes, the program turns on a light to indicate that the digital clock has achieved MLS SYNC, and proceeds to skip the next 31 bits, which are not used by the digital clock. This decision is performed at decision box 104. At this point, the program jumps to subroutine LOAD 4 indicated in FIG. 4 by block 300. The function of subroutine LOAD 4 is to load or accumulate four consecutive bits into a register in the micro-computer. When four bits are found, decision block 302 will return to the calling program. The four bits accumulated by subroutine LOAD 4 correspond to individual time code segments.

The program proceeds to scan the time code segments for the SYNC words. Decision box 106 compares the four bits compiled by subroutine LOAD 4 with hexadecimal 5's or hexadecimal A's. If it is determined that the received four bit code is neither an A or a 5, the program returns to the beginning thereof. If a valid comparison is found, a SYNC counter is incremented in order to find ten consecutive A's or 5's as is indicated by decision box 108. Decision box 108 thus determines if 10 consecutive A's or 5's have been located. If the computer has found less than 10 A's or 5's, the next 46 bits, which correspond to the next MLS SYNC bits and the address bits which the computer need no longer scan are skipped and the program returns to call subroutine LOAD 4. The process of skipping 46 bits is performed at decision box 110 and its related boxes.

Upon recognition of ten SYNC words, the computer, as illustrated, turns on a light to indicate that the code SYNC has been achieved, sets its internal seconds counter to 4.54, and sets a write flag. The write flag is used by the program at a later stage to determine whether or not the received time code message is to be written into internal memory or merely compared with the stored time code. Decision box 112 and its related boxes proceed to skip the next 46 bits as described above. Subroutine LOAD 4 is once again called to compile the next four consecutive data bits. Decision box 114 then determines whether or not the write flag is in the set position. If the write flag is in the set position, the computer will write the received fout-bit time code segment into its random access memory. If the write flag is not set, the program compares the received time code segment with the time stored in random access memory (RAM).

If no error in the comparison is detected by decision box 116, the program proceeds. However, if an error is detected, a character error flag is set. The process is repeated by decision box 118 until ten consecutive time code message segments are received by the digital clock, and are either stored in the internal memory of the digital clock or are merely compared with the time that has been accumulated by the clock. Decision box 120 then determines whether or not an error has been detected by the previous stage as indicated by the character error flag being set. If an error has been detected, the program determines, at decision box 122, whether or not four consecutive frame errors were detected. If four consecutive errors have been found, the program then resets itself in order to re-establish MLS SYNC. If four consecutive frame errors have not been found, the program will continue to process further time code segments. As above, the next 46 bits are skipped by decision box 124 and a 4-bit time code segment is accumulated by subroutine LOAD 4. These time code segments correspond to the position of the satellite and are stored in a separate area in the digital clock memory. Decision box 126 determines if all thirteen characters identifying the satellite position have been read and loops to the beginning of this program section until the determination of the satellite position is complete. Decision boxes 128 and 130 and their associated boxes then proceed to skip the remaining portion of the 30 second record, which is not used by the digital clock. After skipping the remaining sections of the record, the program returns to point A at the top of FIG. 3*b* where it once again will read successive time code segments and compare them with the stored time of the digital clock.

The digital display for satellite position is controlled by a subroutine S POS. indicated in FIG. 4 by numeral 500. This subroutine, which is comprised of decision blocks 502 and 504 and their associated blocks, outputs the assembled satellite position that has been stored in the internal memory of the clock to a digital display described hereinbelow. Thus subroutine is called by subroutine WAIT as noted above.

Referring to FIG. 5, an exemplary configuration of a digital clock system according to the invention, as implemented with a micro computer, is shown. The microprocessor utilized in this system is the Intel 4004 CPU integrated circuit and the associated family of support integrated logic manufactured by Intel Corporation. Complete details of the specifications and operation of the Intel 4004 are given in the Users Manual for the Intel 4004. The microcomputer which is denoted 600, is comprised of a 4201 clock generator 602, a 4004 CPU 604, a reset button 606, a 4008 address latch 608, a 4002 random access memory denoted 610, two programmable, read only, memories of type 4702 which are denoted 612A and 612B, and a 4009 input-/output controller denoted 614. As noted above, the inter-connection of these components is conventional, and described in detail in the Intel 4004 User's Manual.

In order to supply input to and output from the computer, two buffer integrated circuits 616A and 616 B, a 1-of-16 multiplexer 618, six 4-bit latches denoted 622A to 622F, a tri-state buffer 620 and four data lines denoted 624 are provided. Only three of the four possible data lines for input purposes are utilized, the first being the 100 bit per second received data clock, the second being the 8,000 cycle per second bit clock used to multiplex the display described below, and the third being a 100 bit per second clock generated by clock generator 602. Four-bit latches 622A to 622F provide output information from the computer. Output port 0 is used to reset latches 642 and 644 described hereinbelow. An output port 1 provides satellite position data to the satellite position display multiplexer described hereinbelow. Output port 3 provides time-of-year data to the time-of-year multiplexed display, and output port 2 provides a strobe signal for multiplexing that display. Output port 4 is used to drive the MLS and CODE SYNC indicator lights described with relation to the flow chart shown in FIG. 3*a* and 3*b* above. Lastly, output port 5 provides a one pulse per second voltage pulse.

Clock generator 602 is controlled by a high precision crystal 630 which is adjustable in phase by varactor diodes 632. The compensation signal received by diode 632 is generated by comparing the received 100 bit per second data clock with a 100 bit per second clock derived from clock generator 602. Crystal 630 causes clock generator 602 to oscillate at a frequency of 4.096 MHz. Clock generator 602 divides this signal by 8, and, after a phase inversion, produces two out-of-phase 512 KHz, clock signals which are non-overlapping, and are used directly by CPU integrated circuits 604. The exact specifications of these clock signals are described in detail in the Intel User's Manual. One of the two clock signals generated by clock generators 602 is further utilized by a divider chain comprised of a divide-by-2 counter 634, a divide-by-16 counter 636, a divide-by-16 counter 638, and a divide-by-10 counter 640. The resultant signal from this frequency dividing chain is a 100 bit per second square wave of the same phase as clock generator 602. This signal is compared with the 100 bit per second data clock received from the satellite by a latch denoted 648, whose output will have a pulse width dependent on the phase differential between the two signals. The output of latch 648 is low pass filtered by a filter 650 and amplified by an operational amplifier 652 so as to provide a compensation signal for varactor diodes 632. Thus, clock generator 602 is phase locked with the received 100 bit per second data clock. The 100 bit per second output of the divider chain is also stored by a latch 642 which forms one of the inputs on input line 624. Latch 642 is resettable by output port 0. An 8 KHz signal is derived from the middle of the divider chain from one of the outputs of divide-by-16 counter 638. This signal is similarly stored by a latch 644 and forms an additional input to the computer on input line 624.

Referring to FIG. 6, the light emitting diode display system of the digital clock is shown. Satellite position data is stored in a recirculating, 32-word-by-6bit shift register 700 which receives its input information from output port 1. Shift register 700 is controlled by a write/recirculate line 702 which receives its control input from an output signal derived from random access memory 610. Shift register 700 is clocked by a free running oscillator 705 which is gated by a further output signal which is derived from random access memory 610 and appears on line 704. Oscillator 705 is also gated by write/recirculate line 702. Recirculating shift registor 700 is a Signetics 2518 integrated circuit, and its use in a multiplexed display of this type is conventional in nature. Shift register 700 supplies its stored data to a BCD-to-7-segment decoder 706 whose outputs are amplified by segment driver 708 and supplied to multiplexed light emitting diode display 718. The decimal points of display 718 are driven by transistor 716 in conjunction with input resistors 714. Gated oscillator 705 also increments a counter 710 which supplies the digit count to a digit driver 712. As noted above, multiplex displays of this type are well known to those skilled in the art. It should be further noted that this multiplex display is free running, that is, once data is fed into shift register 700 and the gating signals removed, the display will continue to display that information without regard to further computer operations. This is in contrast to the time-of-year display described hereinbelow, which requires computer interaction to perform the multiplexing process.

The time-of-year display is comprised of a BCD-to-7-segment decoder 720 and nine multiplexed light emitting diodes denoted 722, which are driven by nine digit drivers denoted 724. The BCD-to-7-segment decoder 720 receives its data from output port 3 and digit drivers 724 receive their information input for output port 2.

Although the invention has been described with respect to an exemplary embodiment thereof, it will be understood that variations and modifications can be affected in the embodiment without departing from the scope or spirit of the invention.

We claim:

1. A digital clock system in which a data stream is transmitted at a precise data rate, the data stream comprising a plurality of contiguous data records, each data record comprising a plurality of data blocks, each of said blocks having a data synchronization segment and a message code segment, the message code segments within a data record forming a time code message and said message including a message synchronization portion and a time-of-year portion, said clock system comprising:

- receiver means for receiving the transmitted data stream;
- a clock means for generating clock pulses at regular intervals;
- phase lock loop means for phase locking said clock means to the precise data rate of said data stream; and
- logic means for detecting the data synchronization segment of a data block so as to determine the position of each following message code segment in the received data stream, for detecting the message synchronization portion of the time code message so as to determine the beginning of the time code message, for assemblying the complete time code message from the individual received message code segments, for keeping time by counting said clock pulses, for comparing each complete time code message with the time represented by said counted clock pulses so as to provide a determination of whether said time coincides with the complete time code message, and for correcting the time represented by said counted clock pulses so that said time coincides with the complete time code message, responsive to a predetermined number of determinations of non-coincidence between said time and said complete time code message.

2. A digital clock system as claimed in claim 1 wherein said system further comprises display means for displaying the time represented by said counted clock pulses.

3. A digital clock system as claimed in claim 1 wherein the time code message further includes a satellite position portion and said system further comprises further display means for displaying the satellite position portion of the complete time code mssage.

4. A digital clock system as claimed in claim 1 wherein said logic means includes a random access memory.

5. A digital clock system as claimed in claim 1 wherein said logic means includes a firmware programmed micro-computer.

6. A digital clock system as claimed in claim 1 wherein the transmitted data is transmitted by a satellite orbiting the earth.

7. In a digital clock system in which a data is transmitted at a precise data rate, the data stream comprising a plulraity of contiguous data records, each data record comprising a plurality of data blocks, each of said blocks having a data synchronization segment and a message code segment, the message code segments within a data record forming a time code message and said message including a message synchronization portion and a time-of-year portion, a method of maintaining and correcting a time reference comprising the steps of:

- receiving the transmitted data stream;
- generating clock pulses at regular intervals;
- phase locking said clock pulses to the precise data rate of said data stream;
- detecting the data synchronization segment of a data block so as to determine the position of each following message code segment in the received data stream;
- detecting the message synchronization portion of the time code message so as to determine the beginning of the time code message;
- assembling the complete time code message from the individual received message code segments;
- counting said clock pulses to provide a time reference;
- comparing each complete time code message with the time reference represented by said counted clock pulses so as to provide a determination of whether said time reference coincides with the complete time code message; and,
- correcting the time reference represented by said counted clock pulses so that the time reference coincides with the complete time code message, responsive to a predetermined number of determinations of non-coincidence between said time reference and said complete time code message.

8. The method as claimed in claim 7 wherein the method further comprises the step of displaying the time represented by said counted clock pulses.

9. The method as claimed in claim 7 wherein the time code message further includes a satellite position portion, and the method further comprises the step of displaying the satellite position portion of the complete time code message.

10. The method as claimed in claim 7 further including the step of transmitting the data stream from a satellite orbiting the earth.

* * * * *